United States Patent
Kubota et al.

(10) Patent No.: US 11,225,224 B2
(45) Date of Patent: *Jan. 18, 2022

(54) FOREIGN MATERIAL REMOVAL DEVICE

(71) Applicant: KOITO MANUFACTURING CO., LTD., Tokyo (JP)

(72) Inventors: Akinobu Kubota, Shizuoka (JP); Yasuhiro Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 16/539,018

(22) Filed: Aug. 13, 2019

(65) Prior Publication Data
US 2019/0359180 A1 Nov. 28, 2019

Related U.S. Application Data

(63) Continuation of application No. 15/303,972, filed as application No. PCT/JP2015/060877 on Apr. 7, 2015, now Pat. No. 10,436,186.

(30) Foreign Application Priority Data

Apr. 14, 2014 (JP) .............................. 2014-082986
Apr. 14, 2014 (JP) .............................. 2014-082987
Apr. 14, 2014 (JP) .............................. 2014-082988
Feb. 10, 2015 (JP) .............................. 2015-024478

(51) Int. Cl.
*B60S 1/56* (2006.01)
*F04B 35/01* (2006.01)
(Continued)

(52) U.S. Cl.
CPC ................. *B60S 1/56* (2013.01); *B60R 1/00* (2013.01); *B60S 1/54* (2013.01); *F04B 9/02* (2013.01);
(Continued)

(58) Field of Classification Search
CPC ......... A61C 17/028; A47L 5/14; F04B 1/122; F04B 1/143; F04B 9/02; F04B 33/00;
(Continued)

(56) References Cited

U.S. PATENT DOCUMENTS 2,260,113 A 10/1941 Frost
2,309,339 A * 1/1943 Calaway ................. F04B 53/10
417/490

(Continued)

FOREIGN PATENT DOCUMENTS

EP 2631734 A1 8/2013
JP 3-102652 A 4/1991
(Continued)

OTHER PUBLICATIONS

Written Opinion, issued by International Searching Authority in corresponding International Application No. PCT/JP2015/060877, dated May 12, 2015 (PCT/ISA/237).
(Continued)

*Primary Examiner* — Kenneth J Hansen
(74) *Attorney, Agent, or Firm* — Sughrue Mion, PLLC (57) ABSTRACT

Structural simplification and efficient injection state of high-pressure air from a nozzle are ensured. A foreign material removal device is provided with: a cylinder (18) into which air is caused to flow; a piston (22) which is movably supported in the cylinder and feeds the air introduced into the cylinder in a feeding direction as high-pressure air; and a nozzle (6) which injects the high-pressure air fed by the piston. Thus, the piston is moved relative to the cylinder, the high-pressure air is fed from the cylinder, and the high-pressure air is injected from the nozzle, whereby structural simplification and an efficient injection state of the high-pressure air from the nozzle can be ensured.

4 Claims, 10 Drawing Sheets

(51) Int. Cl.
    *F04B 39/00*     (2006.01)
    *B60R 1/00*     (2006.01)
    *F04B 9/02*     (2006.01)
    *B60S 1/54*     (2006.01)
    *H04N 5/225*     (2006.01)
    *F04B 53/00*     (2006.01)

(52) U.S. Cl.
    CPC .......... *F04B 35/01* (2013.01); *F04B 39/0005* (2013.01); *F04B 53/008* (2013.01); *H04N 5/225* (2013.01)

(58) Field of Classification Search
    CPC ........ F04B 33/02; F04B 35/01; F04B 39/005; F04B 39/0016; F04B 53/008; F04B 53/12; F04B 53/123; F04B 33/005; B60S 1/54; B60S 1/56
    USPC .......................................... 417/545, 550, 552
    See application file for complete search history.

(56) References Cited

U.S. PATENT DOCUMENTS

| | | | |
|---|---|---|---|
| 5,299,573 | A | 4/1994 | Kobayashi |
| 2010/0167236 | A1 | 7/2010 | Edwards et al. |
| 2011/0245736 | A1 | 10/2011 | Foehrenbach |
| 2014/0023537 | A1* | 1/2014 | Wang ..................... F04B 33/02 417/437 |

FOREIGN PATENT DOCUMENTS

| | | |
|---|---|---|
| JP | 5-184546 A | 7/1993 |
| JP | 7-121896 A | 5/1995 |
| JP | 2001-171491 A | 6/2001 |
| JP | 2004-202145 A | 7/2004 |
| JP | 2005-138756 A | 6/2005 |
| JP | 2007-315030 A | 12/2007 |
| JP | 3137755 U | 12/2007 |
| JP | 2008-213007 A | 9/2008 |
| JP | 2012-504987 A | 3/2012 |
| JP | 2014-166806 A | 9/2014 |
| WO | 2012042445 A1 | 4/2012 |

OTHER PUBLICATIONS

Search Report dated Mar. 7, 2018 by the European Patent Office in counterpart European Patent Application No. 15779331.6.

International Search Report, issued by International Searching Authority in corresponding International Application No. PCT/JP2015/060877, dated May 12, 2015, (PCT/ISA/210).

* cited by examiner

FOREIGN MATERIAL REMOVAL DEVICE

CROSS-REFERENCE TO RELATED APPLICATIONS

This application is a continuation of U.S. application Ser. No. 15/303,972 filed Oct. 13, 2016, which is a National Stage of International Application No. PCT/JP2015/060877 filed Apr. 7, 2015, which claims priority based on Japanese Patent Application No. 2015-024478, filed Feb. 10, 2015, Japanese Patent Application No. 2014-082986 filed Apr. 14, 2014, Japanese Patent Application No. 2014-082987, filed Apr. 14, 2014, and Japanese Patent Application No. 2014-082988, filed Apr. 14, 2014, the contents of all of which are incorporated herein by reference in their entirety.

FIELD

The present invention relates to a technical field of a foreign material removal device for removing foreign material by injecting high-pressure air from a nozzle.

CITATION LIST

Patent Document

Patent Document 1: Japanese Patent Laid-Open Publication No. 2001-171491

BACKGROUND

Various structures are provided in a structural object such as a vehicle. Out of the structures, for example, for an in-vehicle camera, a vehicle lamp or a rearview mirror, it is desirable to remove foreign material such as moisture, dirt and dust in order to ensure good visibility. For example, the in-vehicle camera is utilized as a device for displaying a video on a display in order to check the rear of the vehicle or to check a position on the outside of the vehicle, which is hardly visible to a driver. An imaging unit of the in-vehicle camera is often contaminated by mud scattered by the driving of the vehicle and or water droplets attached during rainy weather driving or the like. Thus, the video displayed on the display is blurred, which may cause a problem of interfering the checking.

In order to prevent occurrence of such a problem, for example, there is a foreign material removal device for removing foreign material such as moisture, mud and dirt attached to the imaging unit of the in-vehicle camera by injecting high-pressure air from a nozzle to the in-vehicle camera (e.g., see Patent Document 1).

In the foreign material removal device disclosed in Patent Document 1, high-pressure air from a compressed air generation unit is injected to the imaging unit to blow-off the mud and water droplets, thereby removing the contamination of the imaging unit.

The foreign material removal device for removing the contamination of the imaging unit by such compressed air has an advantage such that a liquid storage tank is not required and the injected liquid does not remain on the imaging unit, as compared with a foreign material removal device for removing the contamination by injecting high-pressure liquid such as water.

DISCLOSURE OF INVENTION

Problems to be Solved by Invention

Although the foreign material removal device for removing the contamination of the imaging unit by the compressed air has the advantages as described above, it requires a mechanism for generating high-pressure air and injecting the generated high-pressure air. Depending on the structure of the mechanism, the structure becomes complicated, and thus, manufacturing cost is increased. Further, it is also required to effectively inject high-pressure air from the nozzle.

However, in these respects, a structure of the compressed air generation unit is not mentioned in the foreign material removal device disclosed in Patent Document 1. Therefore, structural simplification or an efficient injection state of high-pressure air from the nozzle may not be ensured in Patent Document 1.

Therefore, the present invention has been made to solve the above problem and an object thereof is to ensure the structural simplification or the efficient injection state of high-pressure air from the nozzle.

Means for Solving the Problems

As a first invention, a foreign material removal device according to the present invention includes a cylinder into which air is caused to flow, a piston which is movably supported in the cylinder and feeds the air introduced into the cylinder in a feeding direction as high-pressure air, and a nozzle which injects the high-pressure air fed by the piston.

With this configuration, the piston is moved relative to the cylinder, so that the high-pressure air is fed from the cylinder and is injected from the nozzle.

As a second invention, in the foreign material removal device according to the present invention described above, preferably, a biasing spring for biasing the piston in the feeding direction is provided, a moving mechanism for moving the piston to a predetermined position in a direction opposite to the feeding direction by applying a moving force to the piston is provided, the biasing force of the biasing spring is increased as the piston is moved in the direction opposite to the feeding direction by the moving mechanism, and, when the piston is moved to the predetermined position by the moving mechanism, the application of the moving force to the piston by the moving mechanism is released, the piston is moved in the feeding direction by the biasing force of the biasing spring, and high-pressure air is fed.

With this configuration, the piston applies a moving force in one direction to the piston.

As a third invention, in the foreign material removal device according to the present invention described above, preferably, the moving mechanism includes a worm which is rotated by a driving force of a drive motor and a worm wheel which is engaged with the worm and rotated by the rotation of the worm, and the driving force of the drive motor is transmitted to the piston via the worm and the worm wheel.

With this configuration, a reduction mechanism where a large reduction ratio is obtained is configured by the worm and the worm wheel.

As a fourth invention, in the foreign material removal device according to the present invention described above, preferably, a rack connected to the piston is provided, a pinion engaged by the rack is provided in the worm wheel, a gear tooth is provided in a portion of an outer periphery of the pinion, a portion of the outer periphery of the pinion where the gear tooth is not provided is formed as a toothless portion, and the portion of the outer periphery of the pinion where the gear tooth is provided is provided as a gear portion.

With this configuration, the piston is moved in the feeding direction by the toothless portion. Accordingly, there is no need to provide a dedicated mechanism for moving the piston in the feeding direction.

As a fifth invention, in the foreign material removal device according to the present invention described above, preferably, a plurality of the gear portions is formed so that the gear portions are spaced with each other in a circumferential direction.

With this configuration, a reciprocating movement of the piston between a top dead center and a bottom dead center is performed multiple times during one rotation of the piston.

As a sixth invention, in the foreign material removal device according to the present invention described above, preferably, the piston and the rack are integrally formed.

With this configuration, there is no need to separately form the piston and the rack, respectively.

As a seventh invention, in the foreign material removal device according to the present invention described above, preferably, a center axis of the piston and an engagement reference line of the rack are substantially matched.

With this configuration, a movement direction of the piston and a movement direction of the rack are substantially the same.

As an eighth invention, in the foreign material removal device according to the present invention described above, preferably, the worm has a lead angle of 9° or more.

With this configuration, irreversibility of the worm is eliminated.

As a ninth invention, in the foreign material removal device according to the present invention described above, preferably, the gear portion is provided with a plurality of gear teeth, the rack is provided with a plurality of rack teeth, the plurality of gear teeth is composed of a first gear tooth and a second gear tooth, the plurality of rack teeth is composed of a first rack tooth and a second rack tooth, the first gear tooth is engageable with the first rack tooth and the second rack tooth, the second gear tooth is engageable with the first rack tooth but is not engageable with the second rack tooth, and the second gear tooth and the second rack tooth are offset from each other when the rack is moved and the worm wheel is rotated by the movement of the piston in the feeding direction.

With this configuration, the second gear tooth of the pinion and the second rack tooth of the rack are not in contact with each other when the rack is moved in the feeding direction.

As a tenth invention, in the foreign material removal device according to the present invention described above, preferably, a width of the second gear tooth is equal to or less than the half of a width of the first gear tooth and a width of the second rack tooth is equal to or less than the half of a width of the first rack tooth.

With this configuration, the structures of the pinion and the rack are not complicated.

As an eleventh invention, in the foreign material removal device according to the present invention described above, preferably, an internal space of the cylinder has a first space and a second space which are continuous with each other in the movement direction of the piston, the first space is located on the feeding direction side than the second space, a diameter of at least a portion of the second space is greater than that of the first space, the piston is provided with a seal portion which is brought into close contact with an inner peripheral surface of the cylinder at least in the first space during movement, and, when the piston is moved to the bottom dead center, the whole of the seal portion is positioned in the second space and the air introduced into the second space flows from the second space toward the first space.

With this configuration, a sealed state of the cylinder by the seal portion is released when the piston is moved to the bottom dead center.

As a twelfth invention, in the foreign material removal device according to the present invention described above, preferably, an air inlet groove extending in the movement direction of the piston is formed on an outer peripheral side of the second space, and the air inlet groove is formed as the portion.

With this configuration, a difference between the diameter of at least a portion of the second space and the diameter of the first space is realized by the air inlet groove.

As a thirteenth invention, in the foreign material removal device according to the present invention described above, preferably, a plurality of the air inlet grooves is formed so that the air inlet grooves are spaced at regular intervals in the circumferential direction.

With this configuration, the flow of air from the second space to the first space is equalized in the circumferential direction of the cylinder.

As a fourteenth invention, in the foreign material removal device according to the present invention described above, preferably, high-pressure air is injected from the nozzle toward an imaging unit of an in-vehicle camera and the nozzle is formed integrally with the in-vehicle camera.

With this configuration, the nozzle and the in-vehicle camera are simultaneously assembled by a single work.

Effects of Invention

According to the present invention, as the piston is moved relative to the cylinder, high-pressure air is fed from the cylinder and is injected from the nozzle. Therefore, it is possible to ensure the structural simplification or the efficient injection state of high-pressure air from the nozzle.

BRIEF DESCRIPTION OF DRAWINGS

FIG. 1 shows an embodiment of a foreign material removal device of the present invention, together with FIGS. 2 to 18.

FIG. 8 shows an operation of the foreign material removal device, together with FIGS. 9 and 10.

FIG. 13 shows a modification of a moving mechanism, together with FIGS. 14 to 18.

FIG. 15 shows an operation of the foreign material removal device, together with FIGS. 16 to 18.

EMBODIMENT OF INVENTION

Hereinafter, an embodiment of a foreign material removal device of the present invention will be described with reference to the accompanying drawings.

Further, in the following, an example where the foreign material removal device of the present invention is applied to a device for removing foreign material attached to an in-vehicle camera has been described. However, the foreign material removal device of the present invention is not limited to be applied to the device for removing foreign material attached to the in-vehicle camera. The foreign material removal device of the present invention is widely applicable as a device for removing foreign material attached to various structures, in particular, as a foreign material removal device for removing foreign material attached to a structure provided in a vehicle, such as a vehicle lamp, a window, a mirror and a collision prevention sensor.

The foreign material removal device described below includes a cylinder, a piston and a nozzle. The foreign material removal device injects high-pressure air from the nozzle as the piston is moved relative to the cylinder.

In the following description, a front-rear direction, an up-down direction and a left-right direction are represented by using a moving direction of the piston as a front-rear direction. Meanwhile, the front-rear direction, the up-down direction and the left-right direction represented below are described for illustrative purpose only. The embodiments of present invention are not limited to these directions.

<Configuration of Foreign Material Removal Device>

A foreign material removal device 1 has a function of removing foreign material such as moisture, mud and dirt attached to an in-vehicle camera 100 for checking the rear of a vehicle, for example. The foreign material removal device 1 is mounted to a rear-end side portion of a vehicle body (not shown).

Figure 1:
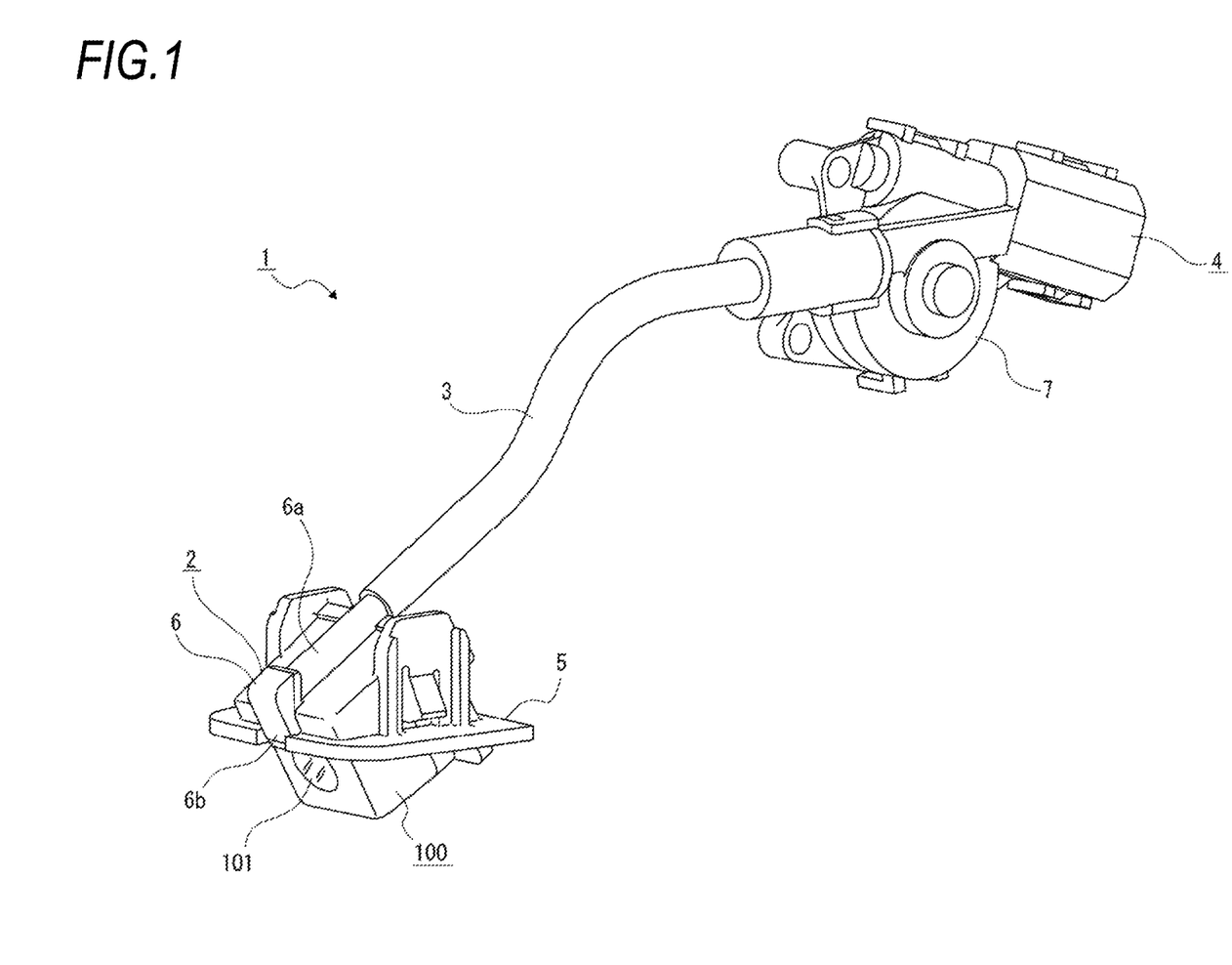
FIG. 1 is a perspective view of the foreign material removal device.

The foreign material removal device 1 includes a nozzle unit 2, a pipe 3 and a high-pressure air generation unit 4 (see FIG. 1).

The nozzle unit 2 has a mounting bracket 5 and a nozzle 6. The mounting bracket 5 is mounted to a rear end portion of a vehicle body. The nozzle 6 has a cylindrical flow portion 6a extending in the front-rear direction and an injection portion 6b continuous to a rear end of the flow portion 6a. The nozzle 6 is formed integrally with the mounting bracket 5.

The nozzle unit 2 is formed integrally with the in-vehicle camera 100. The in-vehicle camera 100 has an imaging unit. A rear end portion of the imaging unit is a lens portion 101. Accordingly, the in-vehicle camera 100 takes an image of a subject through the lens portion 101.

As described above, in the foreign material removal device 1, the nozzle 6 is formed integrally with the in-vehicle camera 100. Therefore, the nozzle 6 and the in-vehicle camera 100 can be simultaneously assembled to a vehicle body by a single work, and thus, an assembling work thereof to the vehicle body can be easily and quickly performed, thereby achieving the improvement in workability.

The pipe 3 is a hose made of, for example, resin or rubber. A front end portion of the pipe 3 is connected to one end of a cylinder (to be described later) of the high-pressure air generation unit 4 and a rear end portion of the pipe 3 is connected to a front end portion of the flow portion 6a of the nozzle 6.

Figure 2:
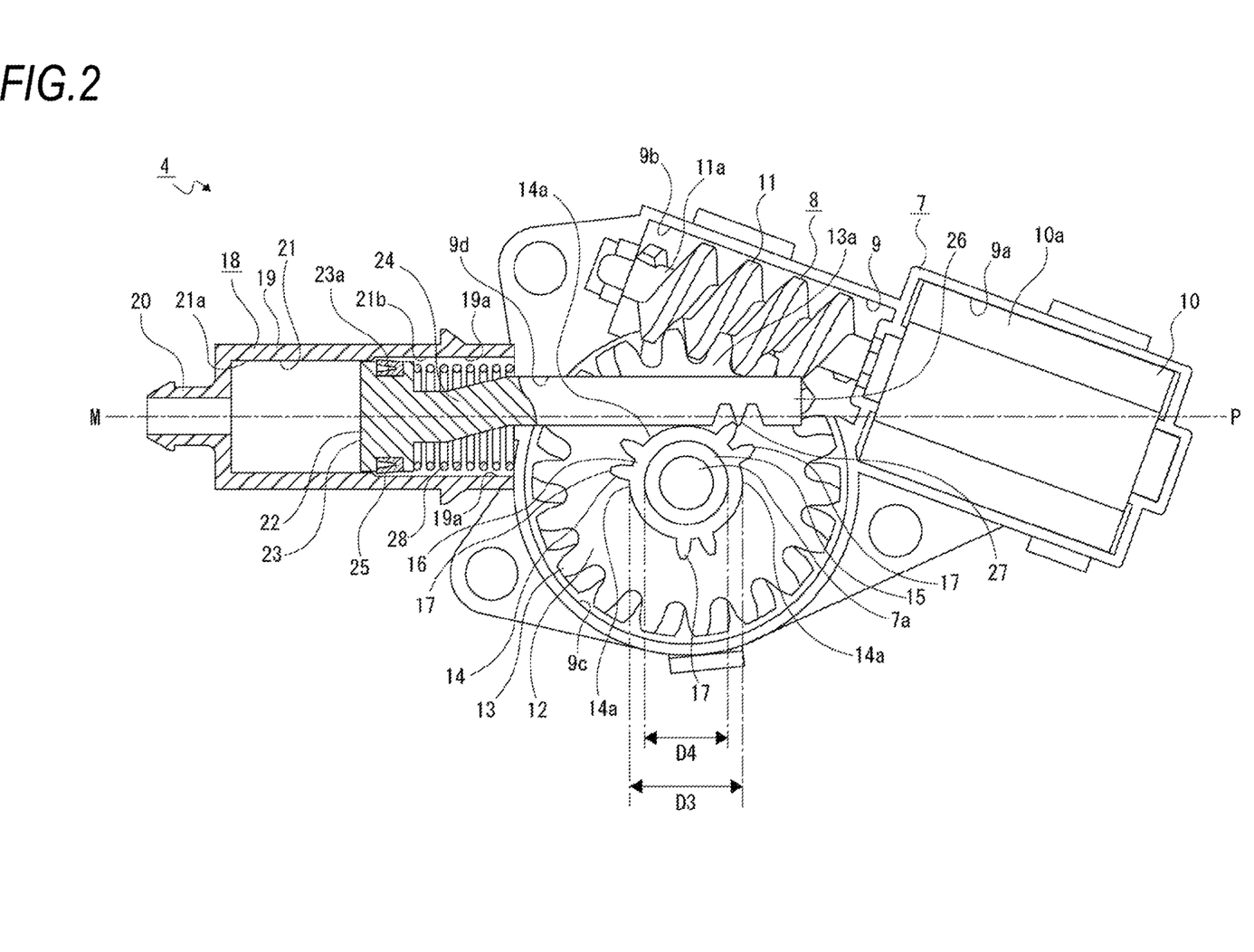
FIG. 2 is a view showing an internal structure of a high-pressure air generation unit.

The high-pressure air generation unit 4 includes a case body 7 and a moving mechanism 8 disposed on the inside of the case body 7 (see FIG. 2). The high-pressure air generation unit 4 is mounted to a portion of the vehicle body on the inside of the vehicle.

An interior of the case body 7 is formed as a placement space 9 which has a motor placement portion 9a, a worm placement portion 9b and a gear placement portion 9c. The motor placement portion 9a and the worm placement portion 9b are positioned in a communicating state in the front-rear direction therebetween. The worm placement portion 9b and the gear placement portion 9c are positioned in a communicating state in the up-down direction therebetween. An insertion hole 9d penetrating in the front-rear direction is formed in a rear end portion of the case body 7. The insertion hole 9d is in communication with the outside of the case body 7 and the gear placement portion 9c.

The case body 7 is provided with a support shaft portion 7a protruding laterally. The support shaft portion 7a is positioned in the gear placement portion 9c.

The moving mechanism 8 includes a drive motor 10, a worm 11 and a worm wheel 12.

The drive motor 10 has a main body portion 10a and a motor shaft 10b. The main body portion 10a is disposed in the motor placement portion 9a (see FIGS. 2 and 3).

The worm 11 is fixedly connected to the motor shaft 10b and disposed in the worm placement portion 9b. The worm 11 has a lead angle of 9° or more. The worm 11 has a cylindrical shaft portion 11a of which thickness is thin. A difference between a diameter D1 of a dedendum circle of the worm 11 and a diameter D2 of the motor shaft 10b is very small (see FIG. 3).

Figure 3:
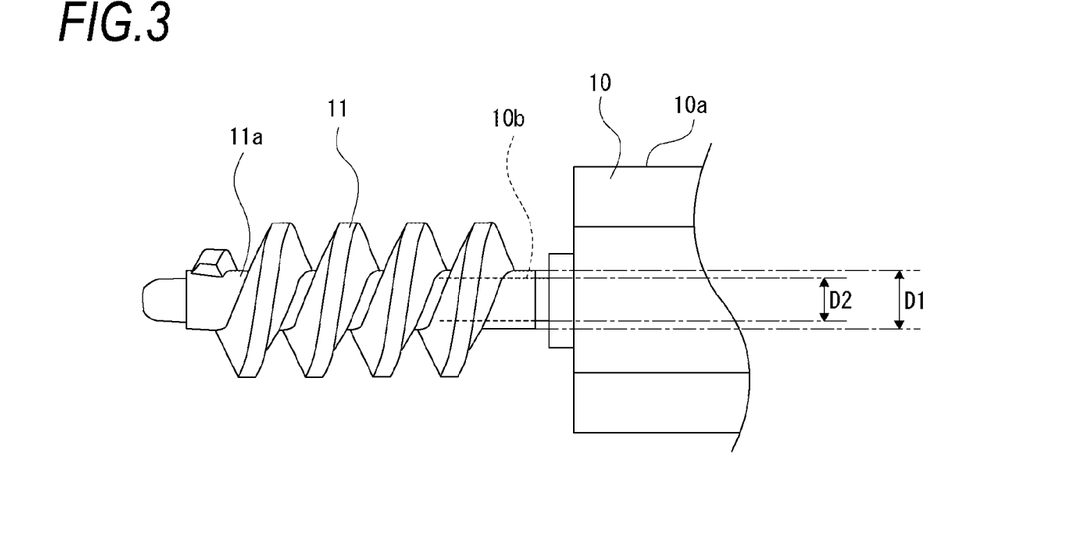
FIG. 3 is an enlarged side view showing a drive motor and a worm.

As such, since the difference between the diameter D1 of the dedendum circle of the worm 11 and the diameter D2 of the motor shaft 10b is very small, it is possible to reduce an outer diameter of the worm 11, thereby reducing the size of the worm 11.

Figure 4:
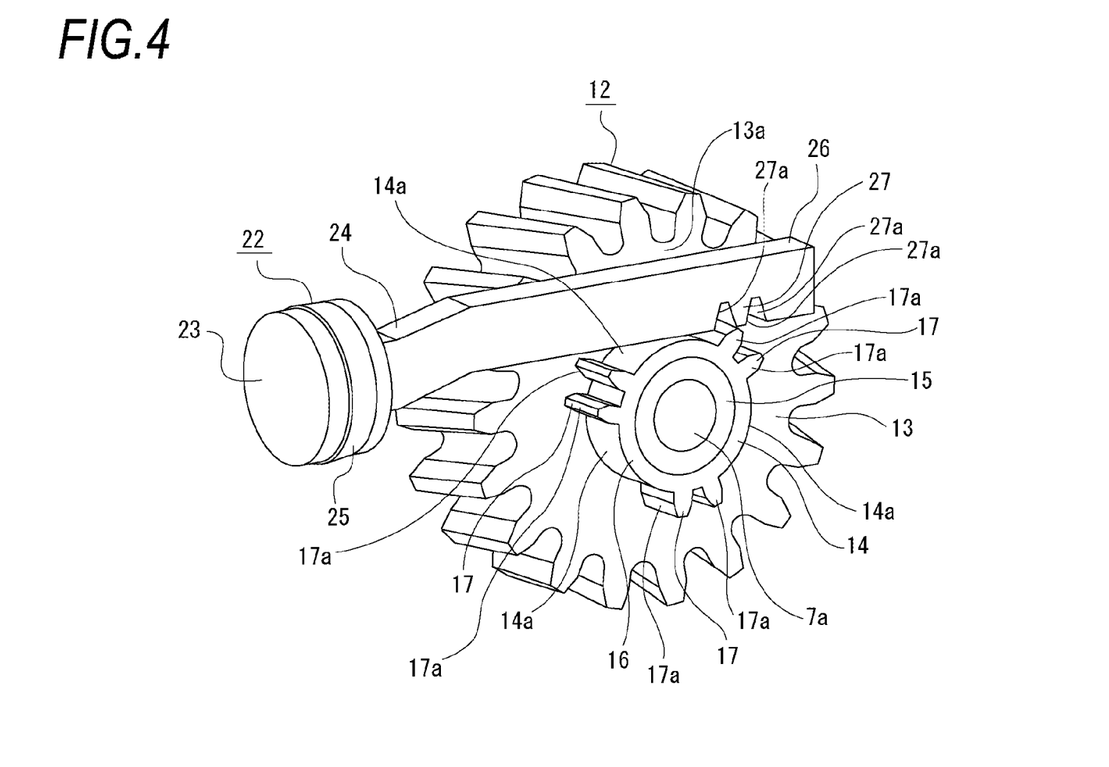
FIG. 4 is an enlarged perspective view showing a worm wheel, a piston and a rack.

The worm wheel 12 is made by integrally forming a driven gear (helical gear) 13 and a pinion 14 protruding laterally from the center portion of the driven gear 13 (see FIGS. 2 and 4). The worm wheel 12 is disposed in the gear placement portion 9c and the center portion thereof is supported on the support shaft portion 7a of the case body 7 via a bearing 15.

The driven gear 13 is engaged with the worm 11. As described above, the worm 11 has a lead angle of 9° or more. Therefore, irreversibility of the worm 11 is eliminated, so that the worm 11 is rotatable along with the rotation of the driven gear 13 even when the driven gear 13 is rotated in either direction.

The pinion 14 is coaxial with the driven gear 13 and has an annular portion 16 supported in the state of being externally fitted on the bearing 15 and gear portions 17, 17, 17 provided on an outer peripheral side of the annular portion 16. The gear portions 17, 17, 17 are provided in the state of being spaced at regular intervals in the circumferential direction. Each gear portion 17 is configured by a plurality of gear teeth, for example, two gear teeth 17a, 17a. Here, the number of the gear teeth 17a of the gear portion 17 is optional, and may be one or may be three or more.

A diameter of an addendum circle of the pinion 14 is smaller than that of a dedendum circle of the driven gear 13. Therefore, a side surface 13a located on an outer peripheral side of the pinion 14 is formed on the side of the driven gear 13 where the pinion 14 is located. Portions between the gear portions 17, 17, 17 are respectively formed as toothless portions 14a, 14a, 14a where the gear tooth 17a is not provided. For example, three toothless portions 14a are formed in the state of being spaced in regular intervals in the circumferential direction.

As described above, the worm wheel 12 is made by integrally forming the driven gear 13 and the pinion 14. Therefore, the number of parts can be reduced and a driving force transmitted from the drive motor 10 to the driven gear 13 can be effectively transmitted to the pinion 14, thereby reducing the size of the drive motor 10.

Further, since the driven gear 13 and the pinion 14 are coaxially arranged, the driving force transmitted from the drive motor 10 to the driven gear 13 can be more effectively transmitted to the pinion 14, thereby further reducing the size of the drive motor 10.

In the worm wheel 12, a thickness of the annular portion 16 of the pinion 14 is thin and a difference between a diameter D3 of a dedendum circle of the worm wheel 12 and a diameter D4 of the bearing 15 is very small (see FIG. 2).

As such, since the difference between the diameter D3 of the dedendum circle of the worm wheel 12 and the diameter D4 of the bearing 15 is very small, it is possible to reduce torque to be generated in the pinion 14.

A cylinder 18 is coupled to a rear end portion of the case body 7. The cylinder 18 is coupled in a state of protruding rearward from the case body 7. The cylinder 18 is made by integrally forming a piston support portion 19 and a connection protruding portion 20 protruding rearward from the piston support portion 19. A diameter of the piston support portion 19 is greater than that of the connection protruding portion 20.

Figure 5:
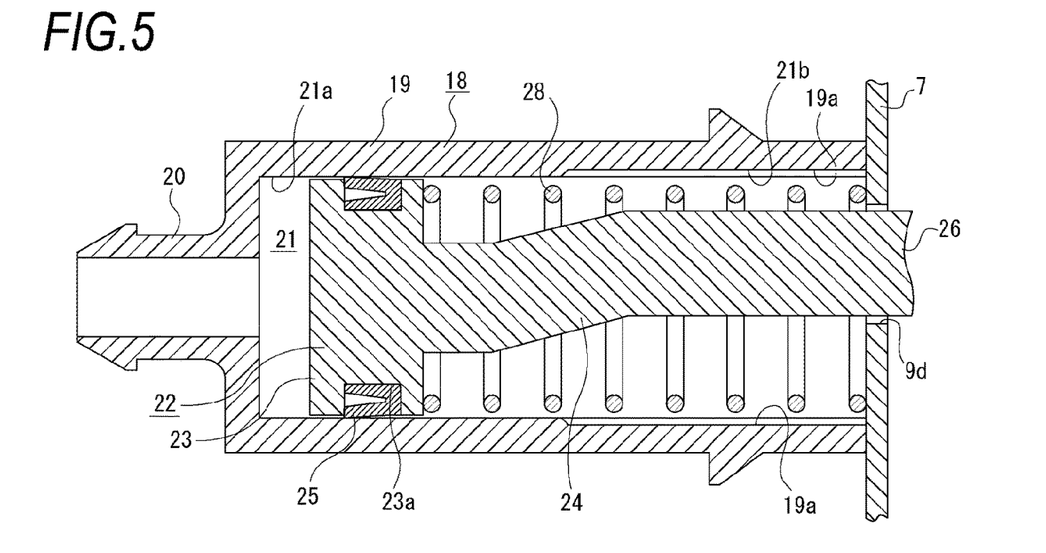
FIG. 5 is an enlarged sectional view showing a state where the piston is positioned at a top dead center.
Figure 6:
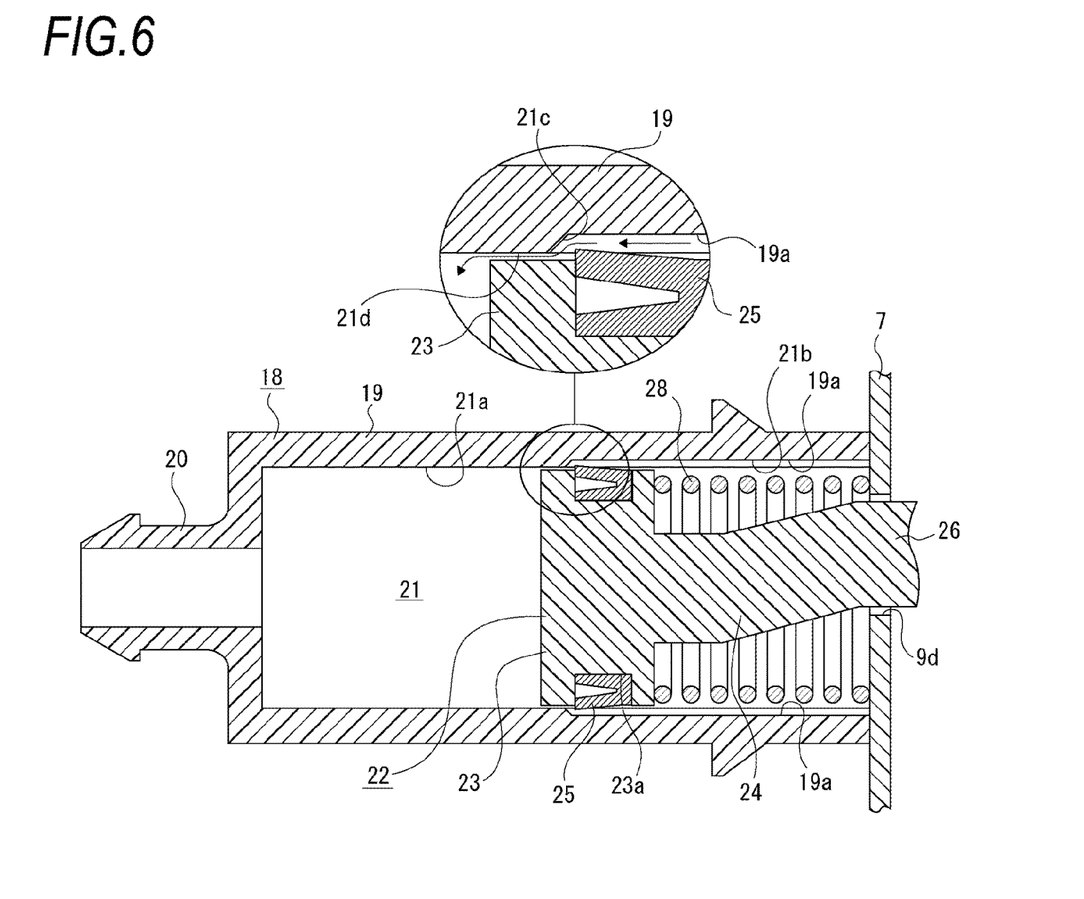
FIG. 6 is an enlarged sectional view showing a state where the piston is positioned at a bottom dead center.

An internal space 21 of the piston support portion 19 has a first space 21a which is an approximately rear half portion and a second space 21b which is an approximately front half portion (see FIGS. 5 and 6).

Figure 7:
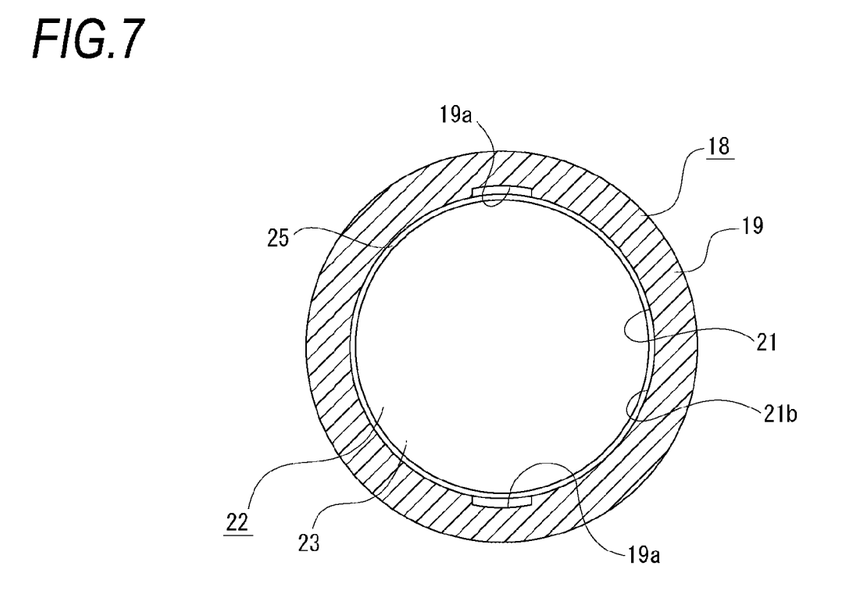
FIG. 7 is an enlarged sectional view showing the cylinder and the piston.

Air inlet grooves 19a, 19a extending in the front-rear direction are formed in the state of being spaced in the circumferential direction in the second space 21b of the piston support portion 19 (see FIGS. 5 to 7). The air inlet grooves 19a, 19a are arranged on 180° opposite sides, for example. Meanwhile, the number of the air inlet groove 19a is optional. When a plurality of air inlet grooves 19a is provided, these air inlet grooves are desirably formed at regular intervals in the circumferential direction.

Since the air inlet grooves 19a, 19a are formed in the second space 21b of the piston support portion 19, the portion of the second space 21b where the air inlet grooves 19a, 19a are formed has a diameter slightly larger than a diameter of the first space 21a. The portion of the second space 21b where the air inlet grooves 19a, 19a are not formed has the same diameter as the first space 21a. The piston support portion 19 is configured such that stepped surfaces 21c, 21c are respectively formed at boundary portions between the first space 21a and the air inlet grooves 19a, 19a (see FIG. 6).

The piston support portion 19 is formed with an air inlet hole (not shown) from which outside air is introduced into the air inlet grooves 19a, 19a.

A center axis of the connection protruding portion 20 coincides with a center axis of the piston support portion 19. A front end portion of the pipe 3 is connected to the connection protruding portion 20.

A piston 22 is movably supported in the piston support portion 19 of the cylinder 18. The piston 22 has a substantially cylindrical actuation portion 23 of which a thickness in the front-rear direction is thin and a connection portion 24 protruding obliquely forward and upward from the center portion of the actuation portion 23. An annular placement groove 23a opening outwardly is formed in the actuation portion 23. An outer diameter of the actuation portion 23 is slightly smaller than a diameter of the first space 21a of the piston support portion 19. Therefore, a gap 21d is formed between an outer peripheral surface of the actuation portion 23 and an inner peripheral surface of the piston support portion 19 in the first space 21a.

A seal portion 25 is disposed in the placement groove 23a. The seal portion 25 is formed of, for example, an elastically deformable rubber or resin. An outer peripheral portion of the seal portion 25 protrudes outward from an outer peripheral surface of the actuation portion 23.

The piston 22 reciprocates in the front-rear direction between the top dead center and the bottom dead center with respect to the cylinder 18. In the top dead center, the whole of the actuation portion 23 is positioned in the first space 21a (see FIG. 5). In the bottom dead center, the whole of the seal portion 25 is positioned in the second space 21b and a rear end portion of the actuation portion 23 is positioned in the first space 21a (see FIG. 6).

The seal portion 25 of the piston 22 slides on an inner peripheral surface of the cylinder 18 in the first space 21a (see FIG. 5). Further, the seal portion 25 slides on an inner peripheral surface of the portion of the cylinder 18 other than the air inlet grooves 19a, 19a in the second space 21b. The seal portion 25 is spaced away from an inner peripheral surface of the piston support portion 19 of the cylinder 18 at the portion where the air inlet grooves 19a, 19a are formed (see FIG. 6). Therefore, in the state where the piston 22 is positioned at the bottom dead center, air (outside air) introduced into the second space 21b flows toward the first space 21a through the gap 21d along the stepped surface 21c, 21c.

A rack 26 extending in the front-rear direction is connected to the connection portion 24 of the piston 22. The rack 26 is formed integrally with the piston 22, for example.

Since the piston 22 and the rack 26 are integrally formed in this way, there is no need to separately form the piston 22 and the rack 26, respectively, thereby reducing the number of parts.

The rack 26 is formed with a rack portion 27 at a position close to a front end thereof. The rack portion 27 is configured by, for example, three rack teeth 27a, 27a, 27a. Here, the number of the rack tooth 27a of the rack portion 27 is optional and may be two or less or may be four or more. The rack 26 is inserted through the insertion hole 9d formed in the case body 7 and the rack portion 27 is engageable with the gear portion 17 of the pinion 14 in the worm wheel 12.

An engagement reference line P of the rack portion 27 of the rack 26 substantially coincides with a center axis M of the piston 22.

As the engagement reference line P of the rack 26 substantially coincides with the center axis M of the piston 22 in this way, the movement direction of the piston 22 is substantially equal to the movement direction of the rack 26, thereby reducing the size of the drive motor 10 owing to the reduction in load of the drive motor 10.

Between the actuation portion 23 of the piston 22 and an outer surface of the case body 7, a biasing spring 28 is supported on the inside of the piston support portion 19 of the cylinder 18. The biasing spring 28 is, for example, a compression coil spring. The piston 22 and the rack 26 are biased rearward by the biasing spring 28. Meanwhile, the movement direction of the piston 22 is a feeding direction in which air is fed to the rear side. The piston 22 and the rack 26 are biased in the feeding direction by the biasing spring 28.

<Operation of Foreign Material Removal Device>

Figure 8:
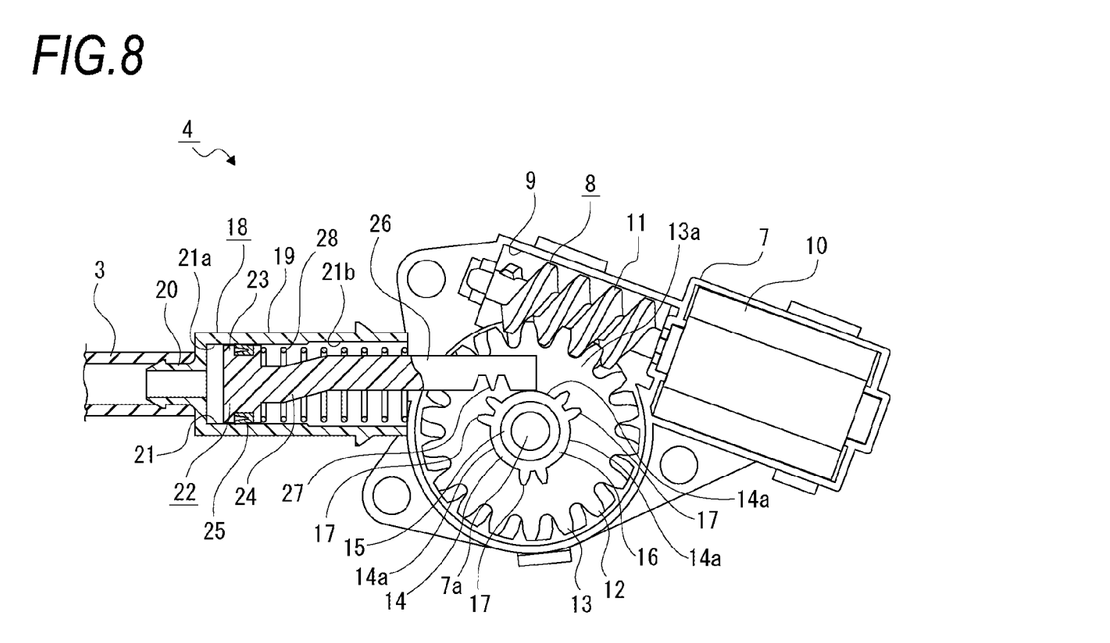
FIG. 8 is a sectional view showing an initial state.

Hereinafter, an operation of the foreign material removal device 1 is described (see FIGS. 8 to 10).

First, an initial state before high-pressure air is fed will be described (see FIG. 8).

In the initial state, the piston 22 is positioned at the top dead center, and the rack portion 27 of the rack 26 is not engaged with the gear portions 17, 17, 17 of the pinion 14 but is located on the toothless portion 14a.

Figure 9:
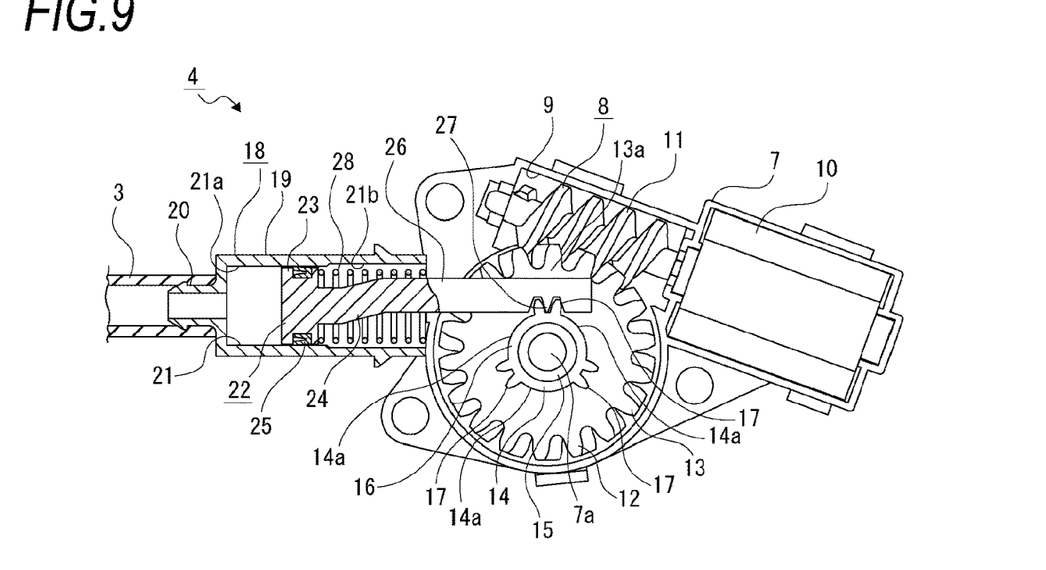
FIG. 9 is a sectional view showing a state where the piston is moved to a position between the top dead center and the bottom dead center.

When the driving of the drive motor 10 is started in the initial state and a driving force of the drive motor 10 is transmitted to the worm wheel 12 through the worm 11, the gear portion 17 of the pinion 14 is engaged with the rack portion 27 of the rack 26 (see FIG. 9). Therefore, by the rotation of the pinion 14, the rack 26 is moved in the direction opposite to the feeding direction against the biasing force of the biasing spring 28.

Figure 10:
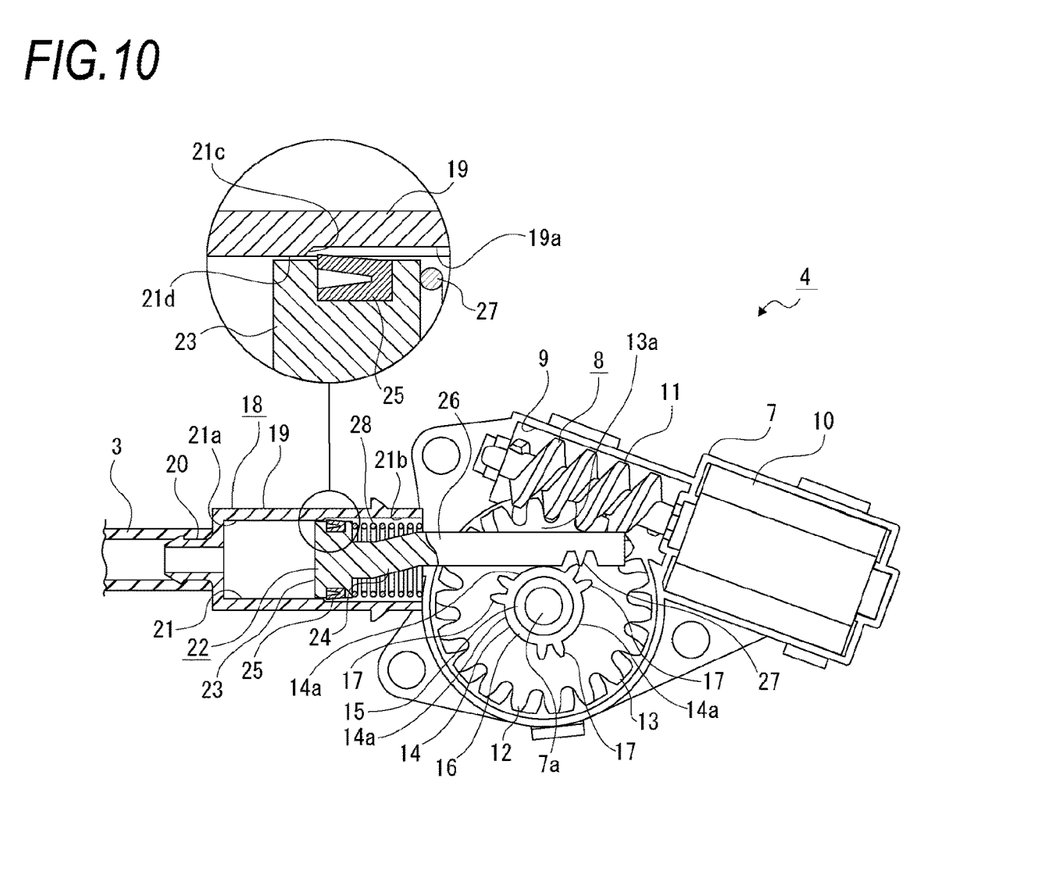
FIG. 10 is a sectional view showing a state where the piston is moved to the bottom dead center.

When the rack 26 is moved in the direction opposite to the feeding direction by the rotation of the pinion 14, the engagement of the gear portion 17 and the rack portion 27 is released at a predetermined position and the piston 22 is positioned at the bottom dead center (see FIG. 10). In the state where the piston 22 is positioned at the bottom dead center, as described above, air (outside air) introduced into the second space 21b flows toward the first space 21a through the gap 21d along the stepped surfaces 21c, 21c.

Since the engagement of the gear portion 17 and the rack portion 27 is released, the piston 22 moved to the bottom dead center is moved in the feeding direction by the biasing force of the biasing spring 28 at higher speed than movement speed in the direction opposite to the feeding direction, and the air introduced into the first space 21a from the second space 21b is fed toward the nozzle 6 of the nozzle unit 2 through the connection protruding portion 20 from the piston support portion 19. At this time, since the cylinder 18 has a configuration that the diameter of the connection protruding portion 20 is smaller than that of the piston support portion 19, the air fed through the connection protruding portion 20 from the piston support portion 19 is compressed into high-pressure air and fed toward the nozzle 6 through the pipe 3.

Then, the high-pressure air is injected from the nozzle 6 and blown to the lens portion 101 of the imaging unit of the in-vehicle camera 100.

As the high-pressure air injected from the nozzle 6 is blown to the lens portion 101, foreign material such as dust, dirt and water droplets attached to the lens portion 101 is blown away, thereby removing the contamination of the lens portion 101.

As described above, in the foreign material removal device 1, the diameter of at least a portion of the second space 21b of the cylinder 18 is larger than that of the first space 21a. Further, when the piston 22 is moved to the bottom dead center, the whole of the seal portion 25 is located in the second space 21b and the air introduced into the second space 21b flows toward the first space 21a from the second space 21b.

Therefore, even when foreign material such as dust and mud enters the nozzle 6 and an injection port of the nozzle 6 is clogged by the foreign material, air is reliably introduced into the first space 21a of the cylinder 18 and the foreign material clogging the nozzle 6 is blown off by high-pressure air which is introduced into the first space 21a and fed by the piston 22. Thus, the clogging of the nozzle 6 by the foreign material can be dissolved, thereby the good injection state of high-pressure air from the nozzle 6 is ensured.

Further, since the difference between the diameter of at least a portion of the second space 21b and the diameter of the first space 21a is realized by the air inlet grooves 19a, 19a, a structure for realizing the difference between the diameter of the second space 21b and the diameter of the first space 21a can be simplified and the actuation portion 23 of the piston 22 can be moved relative to the cylinder 18 also in the second space 21b, so that the stable moving state of the piston 22 can be ensured.

Further, since the air inlet grooves 19a, 19a are formed in the state of being spaced at a regular interval in the circumferential direction, the flow of air from the second space 21b to the first space 21a is equalized in the circumferential direction of the cylinder 18. Therefore, vibration does not occur during the movement of the piston 22, and hence, the stable movement state of the piston 22 can be ensured.

The above-described reciprocating movement of the piston 22 between the top dead center and the bottom dead center is performed by using an engagement between the gear portion 17 of the pinion 14 and the rack portion 27 of the rack 26 and a release therebetween as one cycle, and the movement in the feeding direction of the piston 22 is performed by the presence of the toothless portion 14a of the pinion 14.

Therefore, since the piston 22 is moved in the feeding direction by the presence of the toothless portion 14a, there is no need to provide a dedicated mechanism for moving the piston 22 in the feeding direction. As a result, the size reduction by the simplification of the mechanism of the foreign material removal device 1 can be achieved.

Further, since the foreign material removal device 1 is configured in such that the gear portions 17, 17, 17 are provided at three positions spaced in the circumferential direction of the pinion 14 and three toothless portions 14a, 14a, 14a are formed, the reciprocating movement of the piston 22 between the top dead center and the bottom dead center is performed three times (three cycles) during one rotation of the pinion 14.

Therefore, the number of times of injection of the high-pressure air from the nozzle 6 during one rotation of the pinion 14 can be increased, thereby improving the injection efficiency in the foreign material removal device 1.

Further, in the foreign material removal device 1, as described above, the diameter of the addendum circle of the pinion 14 is smaller than that of the dedendum circle of the driven gear 13, and the piston 22 is moved in a stable state in the front-rear direction by being slid on the side surface 13a of the driven gear 13 when being reciprocated.

Accordingly, there is no need to form a dedicated portion for sliding the piston 22 and an unnecessary gap does not occur between the piston 22 and the side surface 13a of the driven gear 13. Thus, it is possible to achieve the simplification and size reduction of the mechanism.

When the injection from the nozzle 6 described above is completed, the driving of the drive motor 10 is stopped and the piston 22 is stopped at an arbitrary position. However, since, as described above, the worm 11 has a lead angle of 9° or more, irreversibility is eliminated.

Therefore, when the piston 22 is stopped at an arbitrary position and the gear portion 17 of the pinion 14 is engaged with the rack portion 27 of the rack 26, the worm wheel 12 and thus the worm 11 is rotated along with the movement in the feeding direction of the piston 22 by the biasing force of the biasing spring 28. Thus, the piston 22 is moved to the top dead center by the biasing force of the biasing spring 28.

As such, in the foreign material removal device 1, the worm 11 has a lead angle of 9° or more. Therefore, when the driving of the drive motor 10 is stopped, the piston 22 is moved in the feeding direction by the biasing force of the biasing spring 28 and returns to the top dead center, and the engagement between the gear portion 17 of the pinion 14 and the rack portion 27 of the rack 26 is released. Therefore, the load of the drive motor 10 at the start of the operation of the foreign material removal device 1 can be reduced, and wear between the gear portion 17 of the pinion 14 and the rack portion 27 of the rack 26 due to vibration or the like occurring during the driving of the vehicle can be prevented.

In addition, when the piston 22 is located in the vicinity of the top dead center in the state of being stopped at an arbitrary position, the gear portion 17 of the pinion 14 is not engaged with the rack portion 27 of the rack 26 and thus the piston 22 is moved to the top dead center by the biasing force of the biasing spring 28.

<Brief Summary>

As described above, the foreign material removal device 1 is provided with the cylinder 18 into which air is caused to flow, the piston 22 which is movably supported in the cylinder 18 and feeds the air introduced into the cylinder 18 as high-pressure air, and the nozzle 6 which injects the high-pressure air fed by the piston 22 toward the imaging unit of the in-vehicle camera 100.

Therefore, as the piston 22 is moved relative to the cylinder 18, high-pressure air is fed from the cylinder 18 and injected toward the imaging unit from the nozzle 6. Accordingly, it is possible to ensure the structural simplification and the efficient injection state of high-pressure air from the nozzle 6.

Further, the biasing force of the biasing spring 28 is increased as the piston 22 is moved in the direction opposite to the feeding direction by the moving mechanism 8. When the piston 22 is moved to a predetermined position (bottom dead center), the application of the moving force of the moving mechanism 8 to the piston 22 is released and the piston 22 is moved in the feeding direction by the biasing force of the biasing spring 28, thereby feeding the high-pressure air.

Therefore, since the moving mechanism 8 needs to apply a moving force in only one direction to the piston 22, the configuration of the moving mechanism 8 is simplified. Since the piston 22 is moved at a high speed in the feeding direction by the biasing spring 28 in order to generate high pressure air, it is possible to achieve the simplification of the mechanism of the foreign material removal device 1.

Further, since a driving force of the drive motor 10 is transmitted to the piston 22 through the worm 11 and the worm wheel 12, a reduction mechanism in which a large reduction ratio is obtained by a simple mechanism having a small number of parts is configured by using the worm 11 and the worm wheel 12. Further, high conversion efficiency of the moving force of the piston 22 to the driving force of the drive motor 10 can be ensured by a simple mechanism.

<Example Where Check Valve is Provided>

Figure 11:
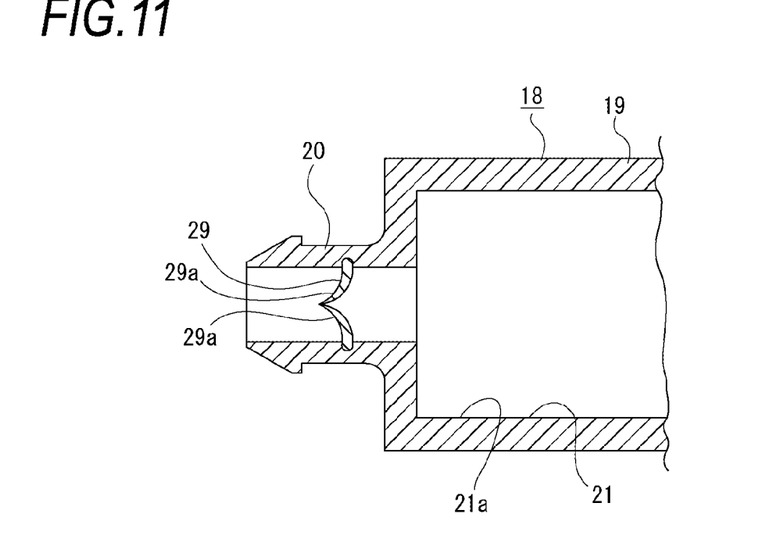
FIG. 11 is a sectional view showing an example where a check valve is provided.
Figure 12:
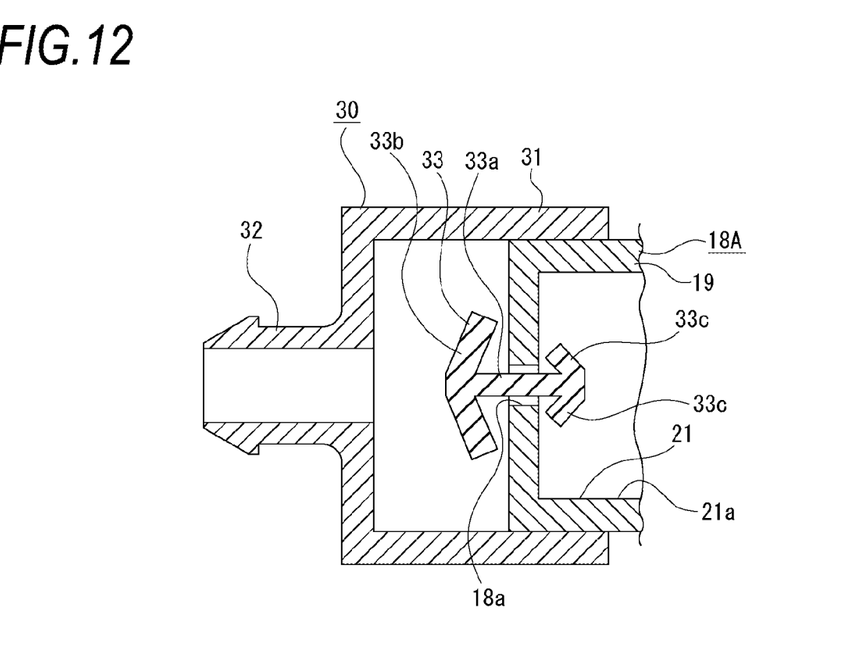
FIG. 12 is a sectional view showing another example where a check valve is provided.

An example where the piston 22 serves as a valve for flow and stop of air into the first space 21a of the cylinder 10 has been described. However, the foreign material removal device 1 may be provided with a valve (check valve). Hereinafter, an example where the check valve is provided will be described (see FIGS. 11 and 11).

In addition, when the check valve is provided, there is no need to cause air to flow into the second space 21b from the air inlet hole. An air inlet hole communicating with the first space 21a may be formed in the piston support portion 19 of the cylinder 18 and air (outside air) may flow into the first space 21a from the air inlet hole. At this time, it is desirable to provide a valve for opening and closing the air inlet hole. When the first space 21a is in a negative pressure state, the air inlet hole is opened by the valve to cause air to flow into the first space 21a. When the negative pressure state of the first space 21a is released, the air inlet hole is closed by the valve to stop the flow of the air into the first space 21a.

Further, each of the following examples where a check valve is provided is different only in the configuration of a rear end portion of the piston 22, as compared with the above configuration in which a check valve is not provided. Accordingly, a detailed description will be given only to the portions different from those of the above configuration, and the other portions are denoted by the same reference numeral as the above configuration and a description thereof is omitted.

First, a first example where a check valve is provided will be described (see FIG. 11).

In the first example, a check valve 29 is mounted to an inner side of the connection protruding portion 20 of the cylinder 18. The check valve 29 is configured by a plurality of elastic members 29a, 29a, . . . formed of, for example, a rubber material or the like, and leading ends thereof are displaced to be curved rearward and are abutted against each other.

When the piston 22 is moved in the feeding direction, the air in the first space 21a is compressed, and hence, an internal pressure of the first space 21a is increased, thereby generating high-pressure air. The leading ends of the elastic members 29a, 29a, . . . are elastically deformed so as to be spaced apart from each other by the pressure of the high-pressure air. Thus, an opening is formed at the center portion of the check valve 29 and the high-pressure air flows toward the nozzle 6 through the opening of the check valve 29 from the first space 21a.

When the piston 22 is moved to the bottom dead center, the internal pressure of the first space 21a is lowered. Therefore, the elastic members 29a, 29a, . . . are elastically returned and the opening formed at the center portion of the check valve 29 is closed, so that the flow of the high-pressure air toward the nozzle 6 is stopped.

When the piston 22 is moved in the direction opposite to the feeding direction in the state where the opening formed at the center portion of the check valve 29 is closed, the first space 21a becomes a negative pressure state and air (outside air) flows into the first space 21a from the air inlet hole.

Next, a second example where a check valve is provided will be described (see FIG. 12).

In the second example, a structure that has no connection protruding portion 20 is provided as a cylinder 18A, and a cap 30 is mounted to a rear end portion of the cylinder 18A in an externally fitted state. The cap 30 is made by integrally forming a mounted portion 31 mounted to the rear end portion of the cylinder 18A and a connection protruding portion 32 protruding rearward from the mounted portion 31. A diameter of the mounted portion 31 is larger than that of the connection protruding portion 32.

A center axis of the connection protruding portion 32 coincides with a center axis of the piston support portion 19 of the cylinder 18A A front end portion of the pipe 3 is connected to the connection protruding portion 32.

A support hole 18a penetrating in the front-rear direction is formed at the rear end portion of the cylinder 18A A check valve 33 is supported in the support hole 18a so as to be movable in the front-rear direction. The check valve 33 is formed of an elastically deformable material such as a rubber. The check valve 33 is composed of a supported shaft portion 33a extending in the front-rear direction, an opening and closing portion 33b protruding outward from a rear end portion of the supported shaft portion 33a, and stopper portions 33c, 33c, . . . protruding outward from a front end portion of the supported shaft portion 33a. A length of the supported shaft portion 33a is longer than that of the support hole 18a and an outer diameter the supported shaft portion 33a is smaller than a diameter of the support hole 18a. The stopper portions 33c, 33c, . . . are projected radially from the supported shaft portion 33a and are spaced apart from each other in the circumferential direction.

When the piston 22 is moved in the feeding direction in the state where the support hole 18a is closed by the opening and closing portion 33b of the check valve 33, the air in the first space 21a is compressed, and hence, an internal pressure of the first space 21a is increased. Thus, the check valve 33 is moved in the feeding direction by the pressure of the air and the closed state of the support hole 18a by the opening and closing portion 33b is released, so that the support hole 18a is opened and the stopper portions 33c, 33c, . . . are brought into contact with an internal surface of the rear end portion of the cylinder 18A As the support hole 18a is opened, air flows to the inside of the cap 30 from the support hole 18a and high-pressure flows toward the nozzle 6 from the cap 30.

When the piston 22 is moved to the bottom dead center, the internal pressure of the first space 21a is lowered. Therefore, the check valve 33 is moved in the direction opposite to the feeding direction and the support hole 18a is closed by the opening and closing portion 33b, so that the flow of the high-pressure air toward the nozzle 6 is stopped.

When the piston 22 is moved in the direction opposite to the feeding direction in the state where the support hole 18a is closed by the opening and closing portion 33b of the check valve 33, the first space 21a becomes a negative pressure state and air (outside air) is introduced into the first space 21a from the air inlet hole.

<Modification of Moving Mechanism>

Hereinafter, a modification of the moving mechanism will be described (see FIGS. 13 to 18). In addition, a moving mechanism 8A according to the modification illustrated below is different from the moving mechanism 8 described above only in the structures of the worm wheel and the rack. Accordingly, a detailed description will be given only to the portions different from the moving mechanism 8, and the other portions are denoted by the same reference numeral as the moving mechanism 8 and a description thereof is omitted.

Figure 13:
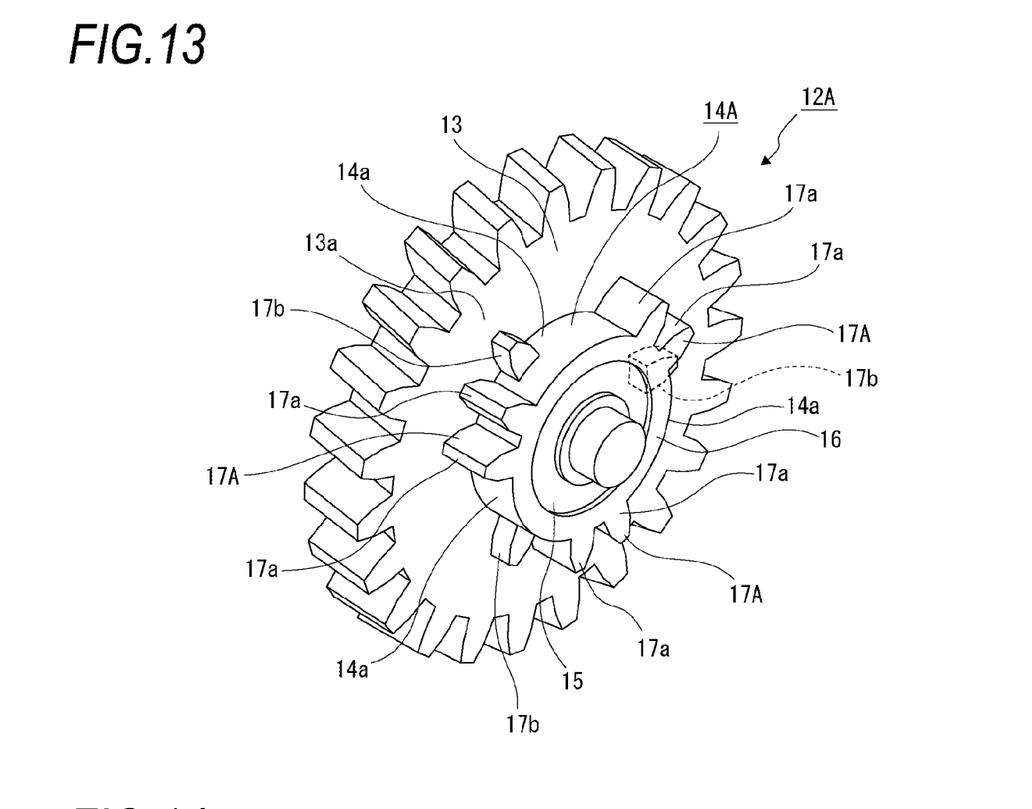
FIG. 13 is a perspective view of a worm wheel.

The moving mechanism 8A includes the drive motor 10, the worm 11 and a worm wheel 12A.

The worm wheel 12A is made by integrally forming the driven gear 13 and a pinion 14A (see FIG. 13). The pinion 14A has the annular portion 16 and gear portions 17A, 17A, 17A. The gear portions 17A, 17A, 17A are provided in the state of being spaced at regular intervals in the circumferential direction. The gear portion 17A is configured by the first gear teeth 17a, 17a and the second gear tooth 17b, for example. Here, in the gear portion 17A, at least one first gear tooth 17a and at least one second gear tooth 17b may be respectively provided and the numbers of the first gear tooth 17a and the second gear tooth 17b are optional, respectively.

The second gear tooth 17b has a width equal to or less than the half of a width of the first gear tooth 17a and is positioned on the driven gear 13 side, for example. The second gear tooth 17b is positioned on the rotation direction side of the worm wheel 12A with respect to the first gear teeth 17a, 17a.

Figure 14:
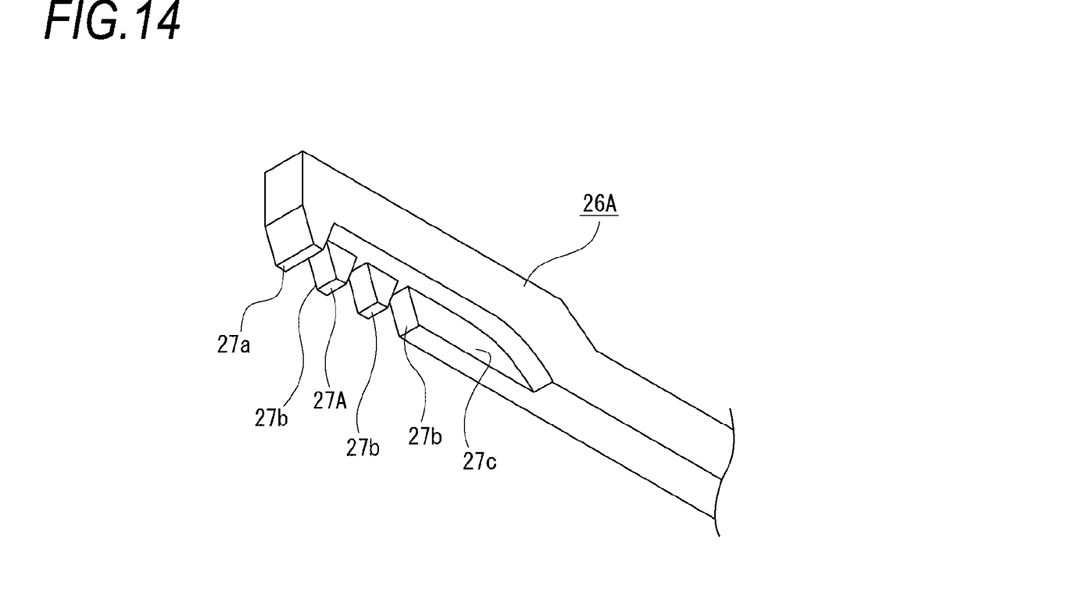
FIG. 14 is a perspective view of a rack.

A rack 26A extending in the front-rear direction is connected to the connection portion 24 of the piston 22. The rack 26A is formed integrally with the piston 22, for example.

A rack portion 27A is formed on a front end side of the rack 26A (see FIG. 14). The rack portion 27A is configured by, for example, a first rack tooth 27a and second rack teeth 27b, 27b, 27b. Meanwhile, in the rack portion 27A, at least one first rack tooth 27a and at least one second rack tooth 27b may be respectively provided and the numbers of the first gear tooth 27a and the second gear tooth 27b are optional, respectively.

The first rack tooth 27a is located at a front end portion of the rack 26A. The second rack tooth 27b has a width equal to or less than the half of a width of the first rack tooth 27a and is positioned on the side away from the driven gear 13 in the state where the rack portion 27A is engaged with the gear portion 17A of the pinion 14A.

The rack portion 27A is formed with a cutout portion 27c which is continuous with the second rack tooth 27b located at the rearmost side. The cutout portion 27c is opened to the driven gear 13 side and to the lower side and a rear end portion thereof is formed in an arcuate shape.

Hereinafter, an operation of the foreign material removal device 1 using the moving mechanism 8A will be described (see FIGS. 15 to 18).

Figure 15:
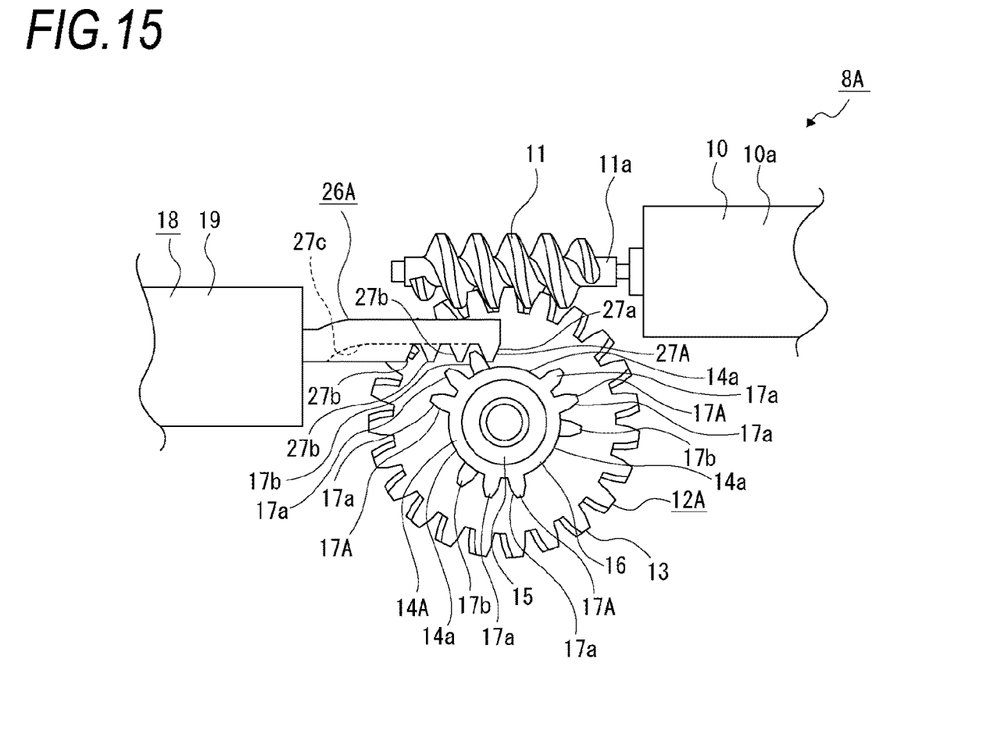
FIG. 15 is a side view showing an initial state.
Figure 16:
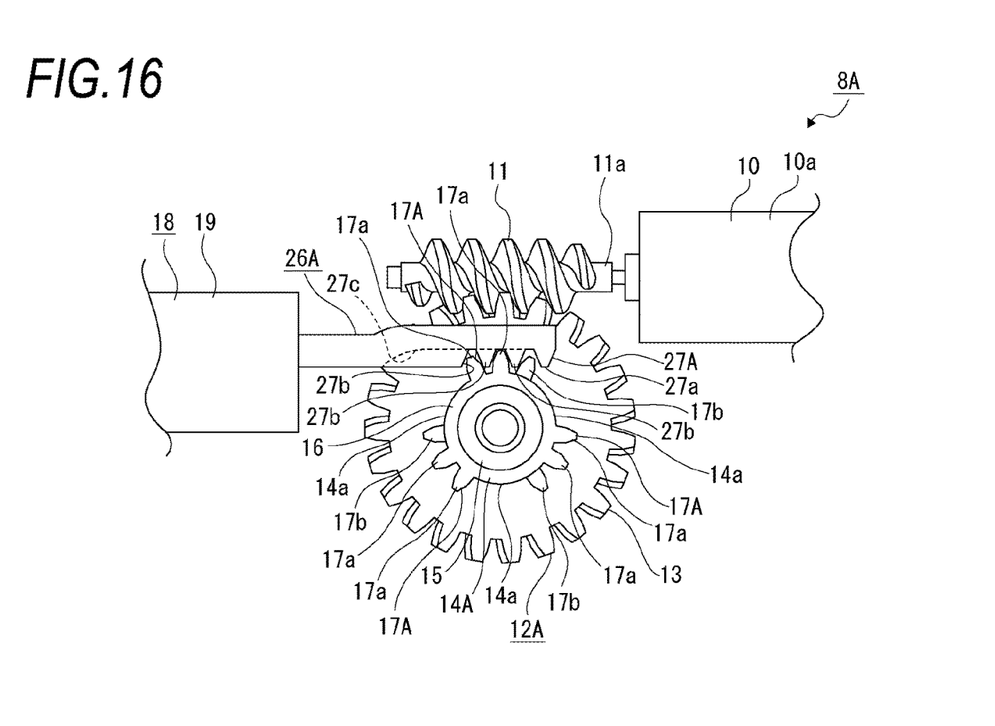
FIG. 16 is a side view showing a state where the rack is moving in a direction opposite to a feeding direction.

In an initial state, as shown in FIG. 15, the piston 22 is positioned at the top dead center and the rack 26A is positioned in a state where the first rack tooth 27a of the rack portion 27A is engageable with or engaged with the second gear tooth 17b of the gear portion 17A of the pinion 14A.

When the driving of the drive motor 10 is started in the initial state, the pinion 14A is rotated in the state where the gear portion 17A of the pinion 14A is engaged with the rack portion 27A of the rack 26A. Thus, the rack 26A is moved, together with the piston 22, in the direction opposite to the feeding direction against the biasing force of the biasing spring 28 (see FIG. 16).

Figure 17:
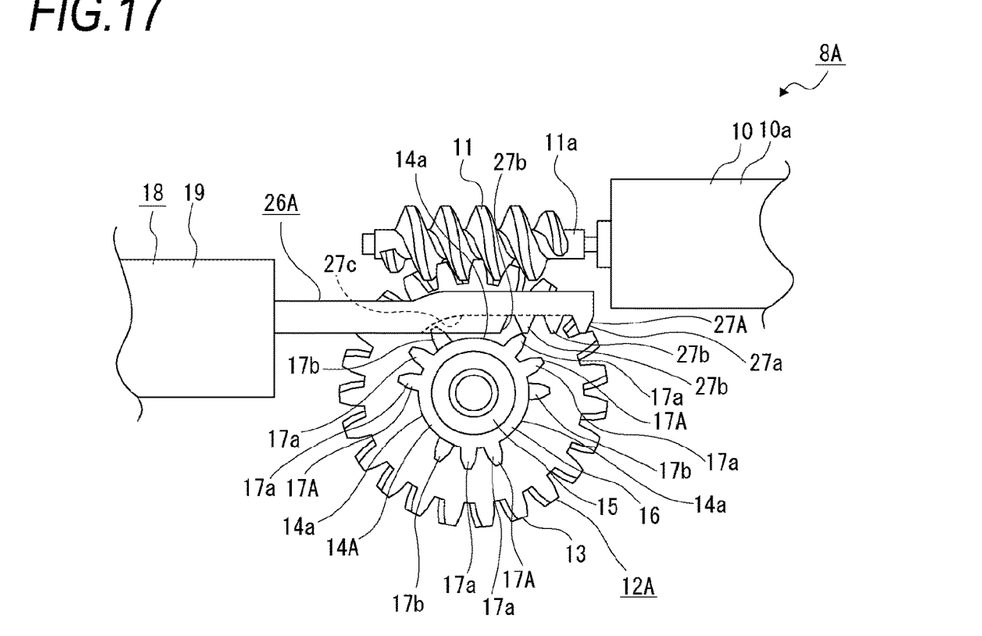
FIG. 17 is a side view showing a state where a second rack tooth is inserted into a cut-out portion of the rack while the rack is moving in the direction opposite to the feeding direction.
Figure 18:
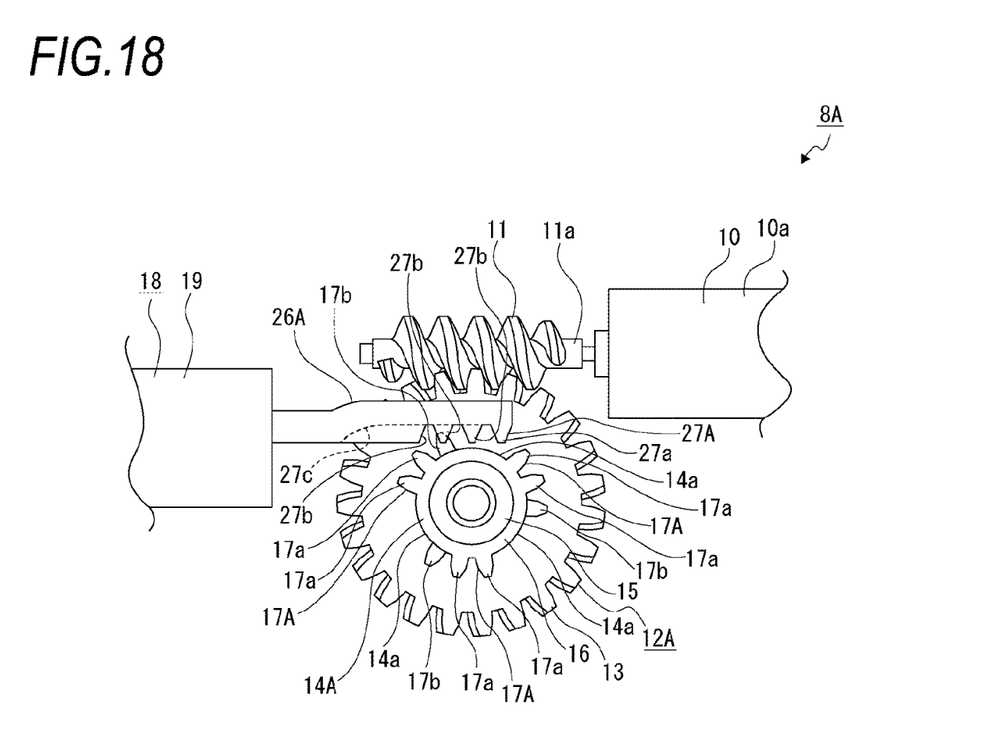
FIG. 18 is a side view showing a state where the engagement between a gear portion and a rack portion is released and thus the rack is moving in the feeding direction.

As the rack 26A is moved in the direction opposite to the feeding direction, the second gear tooth 17b of the gear portion 17A different from the gear portion 17A engaged with the rack portion 27A is inserted into the cutout portion 27c before the piston 22 is moved to the bottom dead center (see FIG. 17).

Further, as the rack 26A is moved in the direction opposite to the feeding direction, the engagement of the gear portion 17A and the rack portion 27A is released at a predetermined position and the piston 22 is positioned at the bottom dead center.

Since the engagement of the gear portion 17A and the rack portion 27A is released when the piston 22 is moved to the bottom dead center, the piston 22 is moved in the feeding direction at higher speed than movement speed in the direction opposite to the feeding direction by the biasing force of the biasing spring 28. Thus, high-pressure air is injected from the nozzle 6 and ejected to the lens portion 101 of the imaging unit of the in-vehicle camera 100. At this time, the second gear tooth 17b inserted into the cutout portion 27c and the second rack teeth 27b, 27b, 27b of the rack 26A are offset from each other (see FIG. 18).

When the rack 26A is moved in the direction opposite to the feeding direction and the piston 22 is positioned at the top dead center, the first rack tooth 27a of the rack portion 27A is again in the state of being engageable with or engaged with the second gear tooth 17b of the pinion 14A (see FIG. 15).

As described above, in the case where the moving mechanism 8A is used, the second gear tooth 17b of the pinion 14A and the second rack teeth 27b, 27b, 27b of the rack 26A are offset from each other when the rack 26A is moved in the feeding direction.

Therefore, when the rack 26A is moved in the feeding direction, the second gear tooth 17b of the pinion 14A and the second rack teeth 27b, 27b, 27b of the rack 26A are not in contact with each other. In this way, it is possible to increase the movement amount of the rack 26A and the piston 22 connected to the rack 26A without increasing the diameter of the pinion 14A.

Further, since the movement amount of the piston 22 can be increased without increasing the diameter of the pinion 14A, it is possible to reduce the size of the foreign material removal device 1 and it is possible to ensure the required movement amount of the piston 22 without increasing the driving force of the drive motor 10.

Further, since the width of the second gear tooth 17b of the pinion 14A is equal to or less than the half of the width of the first gear tooth 17a and the width of the second rack tooth 27b of the rack 26A is equal to or less than the half of the width of the first rack tooth 27a, it is possible to increase the movement amount of the piston 22 without increasing the diameter of the pinion 14A.

Therefore, since the structural simplification of the pinion 14A and the rack 26A can be ensured and the movement amount of the piston 22 can be increased without increasing the diameter of the pinion 14A, it is possible to increase the movement amount of the piston 22 without causing an increase or the like in manufacturing cost of the foreign material removal device 1.

REFERENCE NUMERALS LIST

100 . . . In-vehicle Camera, 1 . . . Foreign Material Removal Device, 6 . . . Nozzle, 8 . . . Moving Mechanism, 10 . . . Drive Motor, 11 . . . Worm, 12 . . . Worm Wheel, 14 . . . Pinion, 14a . . . Toothless Portion, 17 . . . Gear Portion, 17a . . . Gear Tooth, 18 . . . Cylinder, 19a . . . Air Inlet Groove, 21 . . . Internal Space, 21a . . . First Space, 21b . . . Second Space, 22 . . . Piston, 25 . . . Seal Portion, 26 . . . Rack, 27 . . . Rack Portion, 27a . . . Rack Tooth, 28 . . . Biasing Spring, 18A . . . Cylinder, 8A . . . Moving Mechanism, 12A . . . Worm Wheel, 14A . . . Pinion, 17A . . . Gear Portion, 17a . . . First Gear Tooth, 17b . . . Second Gear Tooth, 26A . . . Rack, 27A . . . Rack Portion, 27a . . . First Rack Tooth, 27b . . . Second Rack Tooth

The invention claimed is:

1. A foreign material removal device comprising:
a cylinder into which air is caused to flow;
a piston which is movably supported in the cylinder and feeds air introduced into the cylinder in a feeding direction as high-pressure air; and
a nozzle which injects the high-pressure air fed by the piston, wherein
an internal space of the cylinder has a first space and a second space which are continuous with each other in a movement direction of the piston,
the first space is located on closer to the nozzle than the second space,
a diameter of at least a portion of the second space is greater than a diameter of the first space,
the piston is provided with a seal portion which is brought into contact with an inner peripheral surface of the cylinder at least in the first space during movement, and
when the piston is moved to a bottom dead center, an entirety of the seal portion is positioned in the second space and air introduced into the second space flows from the second space toward the first space,
wherein the piston is moved from the bottom dead center in the feeding direction by a biasing force of a biasing spring.

2. The foreign material removal device according to claim 1,
wherein
an air inlet groove extending in the movement direction of the piston is formed on an outer peripheral side of the second space, and
the air inlet groove is formed as a portion of the second space.

3. The foreign material removal device according to claim 2,
wherein
a plurality of the air inlet grooves are formed so that the air inlet grooves are spaced at regular intervals in a circumferential direction of the cylinder.

4. The foreign material removal device according to claim 1,
wherein
the high-pressure air is injected from the nozzle toward an imaging unit of an in-vehicle camera, and
the nozzle is formed integrally with the in-vehicle camera.

* * * * *